(12) United States Patent
Arreola (10) Patent No.: US 8,015,947 B2
(45) Date of Patent: Sep. 13, 2011

(54) ANIMAL HARNESS

(76) Inventor: Santiago Jim Arreola, Norco, CA (US)

( * ) Notice: Subject to any disclaimer, the term of this patent is extended or adjusted under 35 U.S.C. 154(b) by 253 days.

(21) Appl. No.: 12/415,658

(22) Filed: Mar. 31, 2009

(65) Prior Publication Data

US 2010/0242861 A1 Sep. 30, 2010

(51) Int. Cl.
*A01K 27/00* (2006.01)

(52) U.S. Cl. ......................... 119/792; 119/856

(58) Field of Classification Search .................. 119/856, 119/863, 792–794, 905, 907, 771; 54/71
See application file for complete search history.

(56) References Cited

U.S. PATENT DOCUMENTS

| 378,153 | A | * | 2/1888 | Tiffany | 119/724 |
|---|---|---|---|---|---|
| 2,826,172 | A | * | 3/1958 | Buckle et al. | 119/792 |
| 5,676,093 | A | | 10/1997 | Sporn | |
| 5,743,216 | A | | 4/1998 | Holt, Jr. | |
| 5,755,185 | A | * | 5/1998 | Gallagher | 119/792 |
| 6,789,378 | B1 | * | 9/2004 | Adams, Jr. | 54/71 |
| 2010/0122667 | A1 | * | 5/2010 | Horgan | 119/792 |

* cited by examiner

*Primary Examiner* — Rob Swiatek
*Assistant Examiner* — Kristen Hayes
(74) *Attorney, Agent, or Firm* — Julio M. Loza; Loza & Loza, LLP (57) ABSTRACT

A harness for inhibiting an animal from straining against a leash and inducing the animal to come to a halt or to a walk or run at a pace acceptable to the animal handler is provided. The harness may include a longitudinal strap having a set of loop straps extending from the longitudinal strap for placing around the body of the animal. Each loop strap in the set of loop straps may be adjustable to fit the size of the animal on which it is placed so that the harness may be suitable for animals of varying sizes. A continuous cord may be secured to the set of loop straps defining a front restraining member and a back restraining member. Pulling upwards on the cord causes the front and back restraining members to pull inward applying pressure to the front and back legs of the animal to restrain the animal.

20 Claims, 7 Drawing Sheets

ANIMAL HARNESS

FIELD

The present invention relates to an animal harness for humanely restraining and controlling an animal with improved ease.

BACKGROUND

A harness for an animal is typically worn in conjunction with a collar and used as an alternative for leash attachment. While a collar only encircles the neck of the animal, harnesses generally have a loop that surrounds the torso or body of the animal as well, with connecting straps between them for reinforcement. The use of a harness allows for distribution of force on the body of the animal which may prevent choking and reduce the possibility of the animal slipping out that may be possible with only a collar. Harness usage is growing in popularity among many pet owners—especially for those with smaller breed dogs.

With the growing use of harnesses, many problems arise. For example, conventional animal harnesses typically require a significant amount of effort for a handler to control and restrain the animal. Furthermore, conventional harnesses (such as dog collars) put a strain on the animal's neck which can result in injury. Consequently, an animal harness that can humanely restrain and control an animal with minimal effort is needed.

SUMMARY OF THE PRESENT INVENTION

In one embodiment a harness for inhibiting an animal, such as a dog, from straining against a leash and inducing the dog to come to a halt or to a walk or run at a pace acceptable to the leash holder, or animal handler is provided. The harness may include a longitudinal strap for placing on the back of an animal and a set of loop straps extending downwardly from the longitudinal strap for placing around the body of an animal. The set of loops may be directly attached to the longitudinal strap, for example sewn together or directly attached by any other method known in the art, or each loop in the set of loops may be inserted into separate openings of the longitudinal strap. The set of loop straps may include a first loop strap, a second loop strap and a third loop strap.

The first loop strap may be for placing around the neck of the animal and may include at least one first adjustable member for selectively adjusting the length of the first loop strap to accommodate the size of the neck of the animal.

The second loop strap may be for placing around a front body portion of the animal and may include at least one second adjustable member for selectively adjusting the length of the second loop strap to accommodate around the front body portion of the animal.

The third loop strap may be for placing around a back body portion of the animal and may include at least one third adjustable member for selectively adjusting the length of the third loop strap to accommodate around the back body portion of the animal.

The harness may also include a lower front strap secured to the first loop strap and to the second loop strap for preventing the first loop strap from slipping off the neck of the animal.

A continuous cord may be secured to the set of loop straps and lower front strap defining a front restraining member and a back restraining member. Pulling upwards on the continuous cord causes the front and back restraining members to pull inward applying pressure to the front and back legs of the animal to humanely restrain the animal.

BRIEF DESCRIPTION OF THE DRAWINGS

Various features of the present invention will be better understood from the following detailed description of an exemplary embodiment of the invention, taken in conjunction with the accompanying drawings in which like reference numerals refer to like parts.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention.

In the following description, certain terminology is used to describe certain features of one or more embodiments of the invention. The term "attaching member" refers to a hook; clasp any other type of device that may be used for attaching to items together. The term "connecting member" refers to a ring, junction or any other type of device that may be used for connecting two or more straps.

According to the present invention, a harness for inhibiting an animal, such as a dog, from straining against the leash and inducing the dog to come to a halt or to a walk or run at a pace acceptable to the leash holder, or animal handler, is provided. Although the harness of the present invention is described implemented on a dog, those skilled in the art will recognize that the principles and teachings described herein may be applied to a variety of four-legged animals including, but not limited to, cats, pigs, rabbits, guinea pigs, ferrets, iguanas and the like. The harness is also suitable for animals of varying sizes whose sizes may range from small to large, as the harness is adjustable to the size of the animal on which it is placed.

Figure 1:
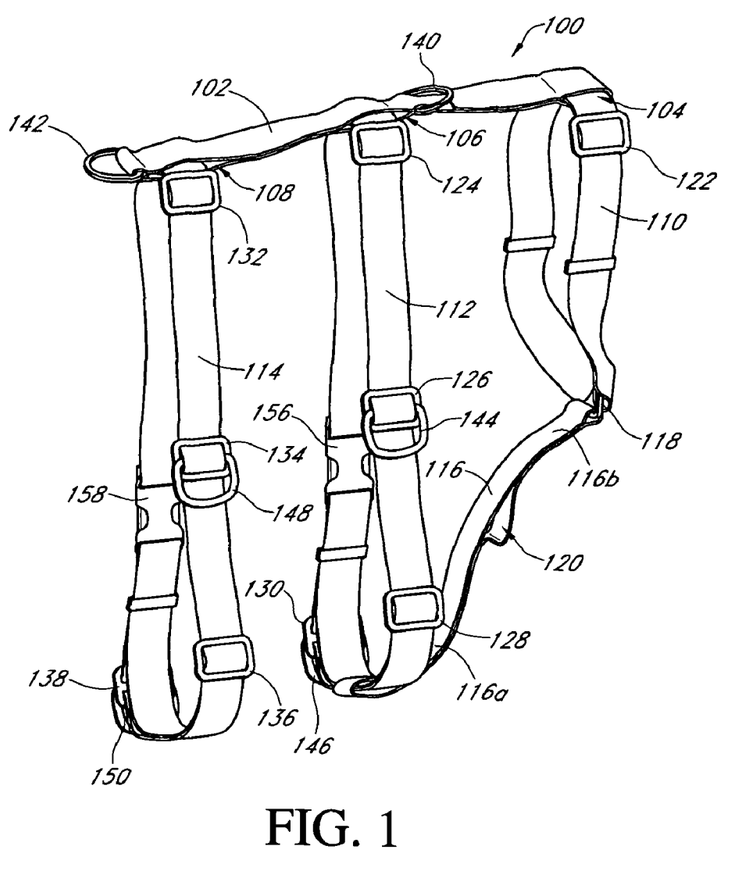
FIG. 1 is a perspective view of an animal harness according to the present invention.

FIG. 1 is a perspective view of an animal harness 100 according to an embodiment of the present invention. The harness 100 may include a longitudinal strap 102 having a set of loop straps extending downwardly from the longitudinal strap 102 for placing around the body of an animal. The set of loops straps may be directly attached to the longitudinal strap 102, for example sewn together or directly attached by any other method known in the art, or each loop in the set of loop straps may be inserted into separate openings of the longitudinal strap 102, such as openings 104, 106 and 108.

The set of loop straps may include a first loop strap 110 which may slip over, and extend around the neck of the animal, a second loop strap 112 which may extend around a front end, or chest portion, of the animal and a third loop strap 114 which may extend around a back end of the animal. Once the first loop strap 110 has been placed over the animal's head, a lower front strap 116 may be used to ensure the harness 100 does not slip off of the animal. The lower front strap 116 may have a first end 116a secured to the second loop strap 112 and a second end 116b secured to a front connecting member 118. The lower front strap 116 may further include a lower front strap opening 120 for insertion of a continuous cord or lead, as discussed below.

The set of loop straps 110, 112 and 114 may include one or more adjustable buckles or trislides, such as trislides 122-138, that may be used to adjust or vary the length of the straps to accommodate the harness 100 to the body of the animal. The bigger the animal the greater the distance between its shoulder and chest and the greater the length of the strap which runs between the shoulder and the chest junctions needs to be. The number of trislides on the set of loop straps 110, 112 and 114 may vary by the size of the harness and the varying ranges of sizes the harness 100 may be adjusted to. Although one trislide is shown on the first loop strap 104 and four trislides are shown on the second and third loop straps 112, 114, this is by way of example only and each strap may have more or less trislides. In one embodiment, no trislides may be needed. In an alternative embodiment, other types of buckles may be used instead of trislides.

The longitudinal strap 102 and the set of loop straps 110-114 may also include one or more rings 140-150, such as D-rings, for securing a continuous cord or lead to the harness 100. Although six rings are shown on the harness 100, this is by way of example only and the harness 100 may have more or less rings. In one embodiment, the rings 140-150 may be formed from a resilient plastic, metal or other suitable material known in the art.

Figure 2:
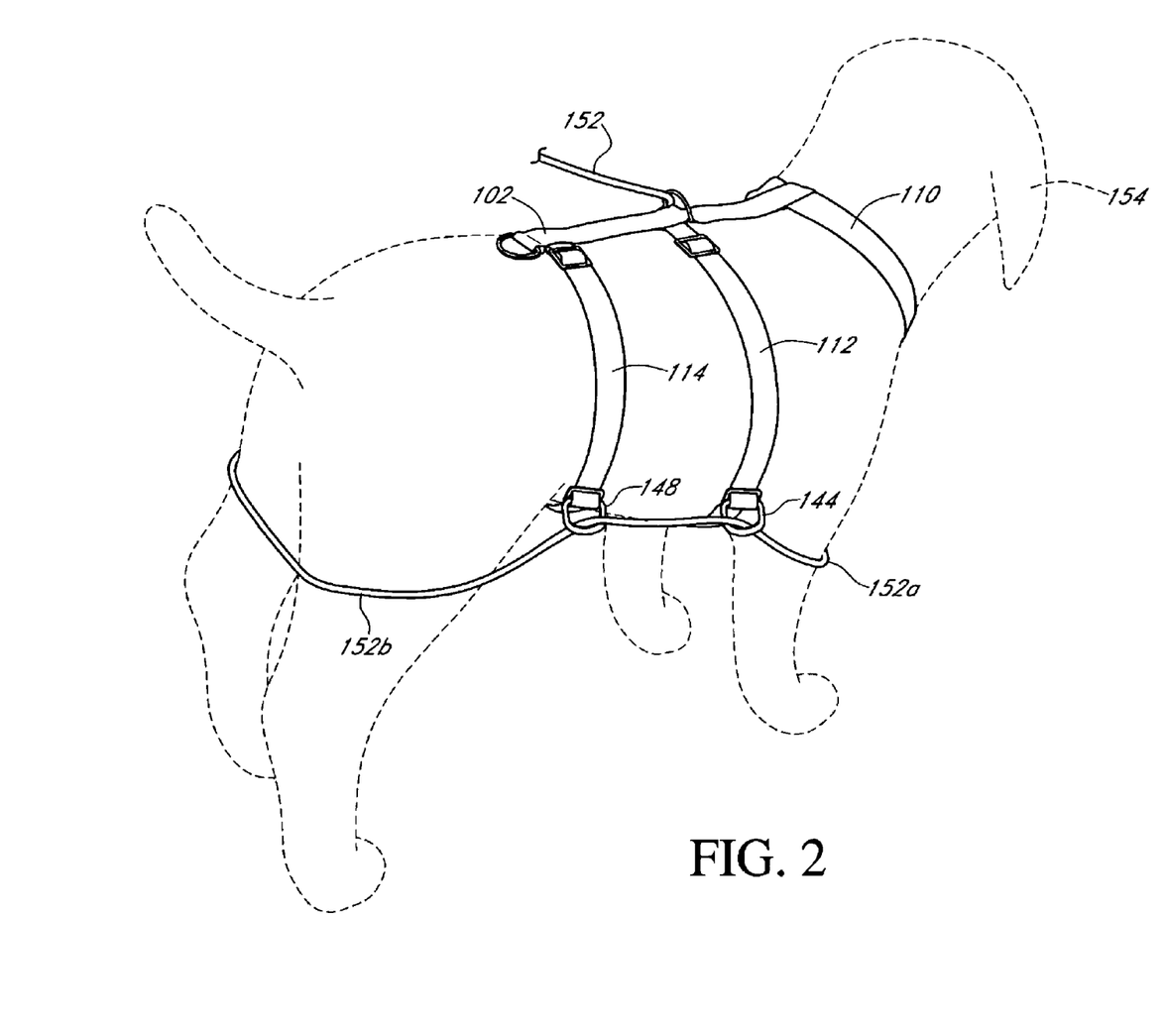
FIG. 2 is a side perspective view of the animal harness of FIG. 1, with a lead, fitted on an animal.
Figure 3:
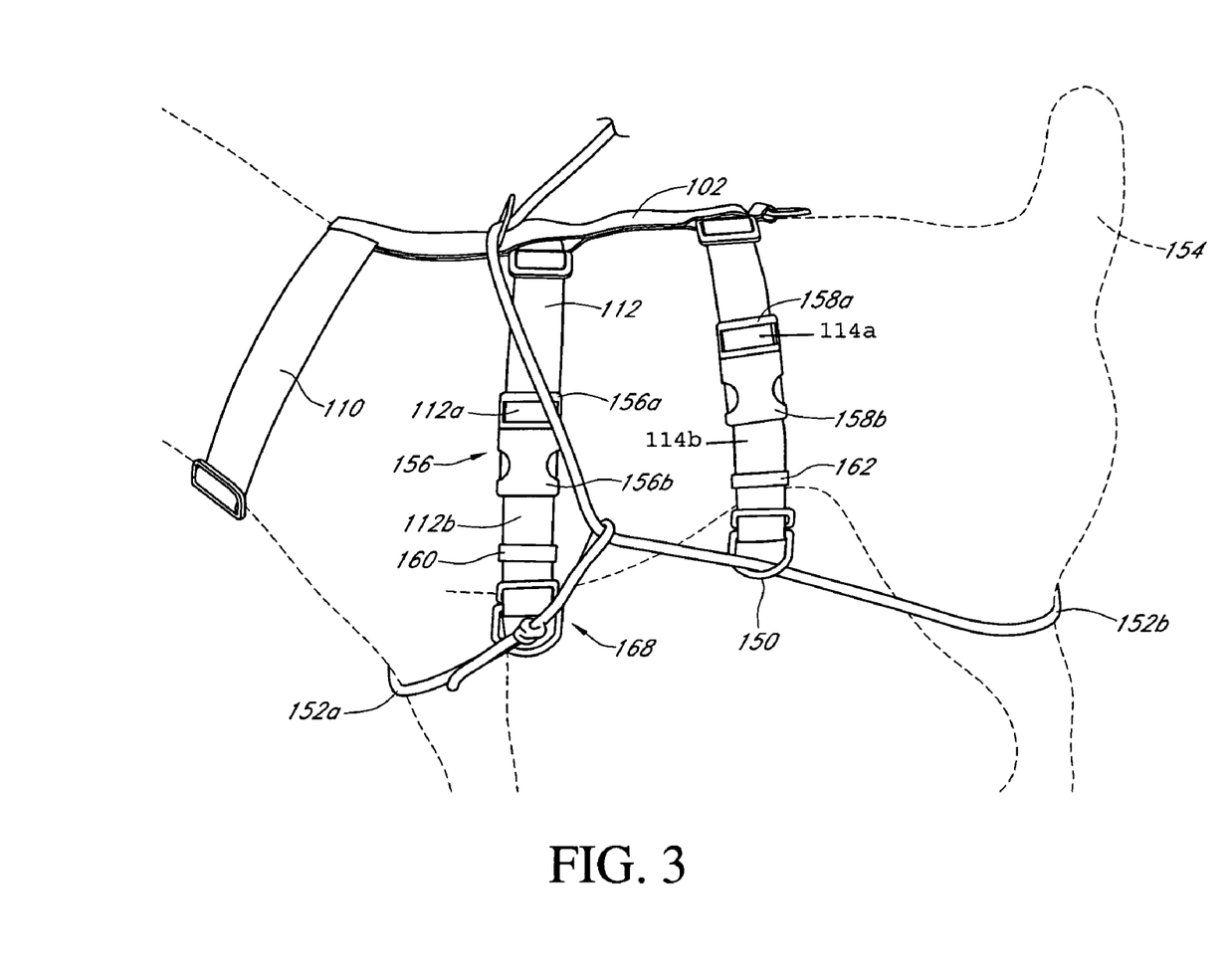
FIG. 3 is a left side view of the animal harness and lead of FIG. 2 fitted on an animal.
Figure 4:
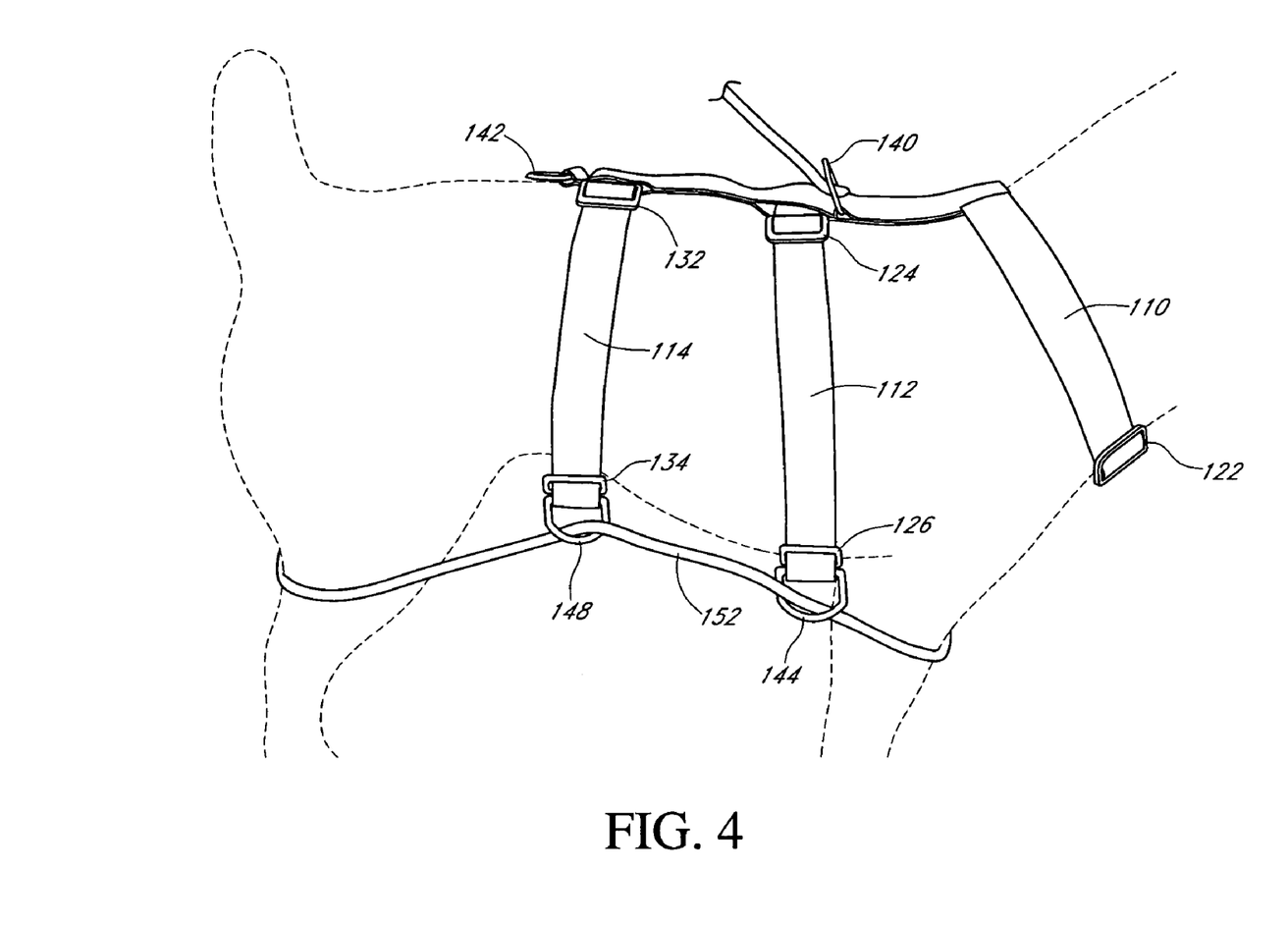
FIG. 4 is a right side view of the animal harness and lead of FIG. 2 fitted on an animal.
Figure 5:
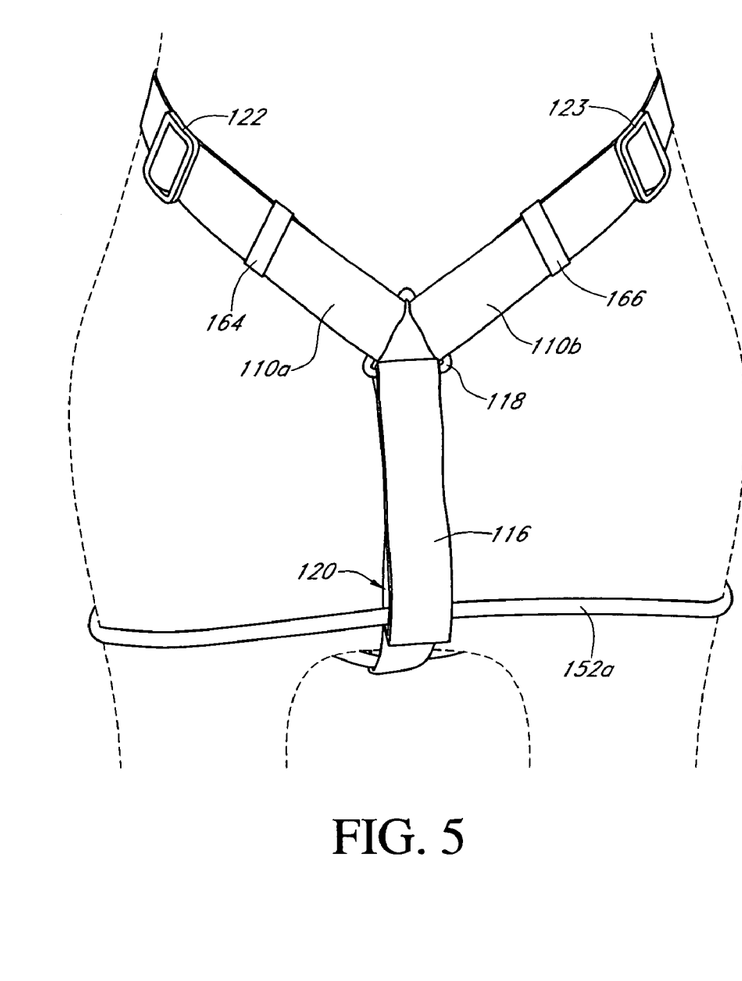
FIG. 5 is a front view of the animal harness and lead of FIG. 2 fitted on an animal.

FIGS. 2-4 are perspective, left and right side views, respectively, of the animal harness 100 of FIG. 1, with a continuous cord or lead 152, fitted on an animal 154. The first loop strap 110 of the harness may include a first end loop 110a and a second end loop 110b (See FIG. 5) which may pass through trislides 122 and 123 and bands 164 and 166, respectively, in any known manner. Upon passing through bands 164 and 166, the first and second end loops 110a and 110b may then pass through the front connecting member 118 and then may be reverse folded, or doubled-back on itself, such that the end loops 110a and 110b may pass through band 164 and 166 and trislides 122 and 123 for a second time. After passing through trislides 122 and 123, first and second end loops 110a and 110b may then be reverse folded, or doubled-back on themselves and sewn together securing the end loops 110a and 110b to trislides 122 and 123, to permit adjustment of the length of the first loop strap 110 to accommodate the size of the neck of the animal.

The second loop strap 112 may include first and second end loops 112a and 112b. The first end loop 112a may be secured to a first top connector portion 156a and the second end loop 112b may be secured to a first bottom connector portion 156b. The first top connector portion 156a may be detachably connected to the first bottom connector portion 156b forming a first connector or attaching member 156. In securing the first end loop 112a to the first top connector portion 156a, the first end loop 112a may pass, in a known manner, through an opening in the first top connector portion 156a and may then be reverse folded, or doubled-back on itself, and sewn together to secure attachment to the first top connector portion 156a. In securing the second end loop 112b to the first bottom connector portion 156b, the second end loop 112b may pass, in a known manner, through ring 160 and then through an opening in the first bottom connector portion 156b. After passing through the opening, the second end loop 112b may then pass back through band 160 to trislide 130 and may then be reverse folded, or doubled-back on itself, and sewn together to secure attachment to trislide 130 to permit adjustment of the length of the second loop strap 112 to accommodate the size of the front portion of the animal's body.

The third loop strap 114 may include first and second end loops 114a and 114b. The first end loop 114a may be secured to a second top connector portion 158a and the second end loop 158b may be secured to a second bottom connection portion 158b. The second top connector portion 158a may be detachably connected to the second bottom connector portion 158b forming a second connector or attaching member 158. In securing the first end loop 114a to the second top connector portion 158a, the first end loop 114a may pass, in a known manner, through an opening in the second top connector portion 158a and may then be reverse folded, or doubled-back on itself, and sewn together to secure attachment to the second top connector portion 158a. In securing the second end loop 114b to the second bottom connector portion 158b, the second end loop 114b may pass, in a known manner, through band 162 and then through an opening in the second bottom connector portion 158b. After passing through the opening, the second end loop 114b may then pass back through the band 162 to a trislide 138 and may then be reverse folded, or doubled-back on itself, and sewn together to secure trislide 138 to permit adjustment of the length of the third loop strap 114 to accommodate the size of the back portion of the animal's body.

The lead may include a continuous cord 152 that may be used to humanely control and restrain the animal 154. The continuous cord 152 may be placed around the animal's body and secured to the harness 100 by rings 144-150. While it is contemplated that continuous cord 152 may be in the form of a cord having a generally circular cross-section as shown, and be manufactured from a nylon or other appropriate material, it is also contemplated that the continuous cord 152 may be in the form of braided nylon rope, nylon webbing, leather or any other styles and/or materials known in the art. Accordingly, the term continuous cord 152 as used herein is used merely for convenience to refer to any such member, and should not be construed so as to limit the invention to the specific design shown.

Figure 6:
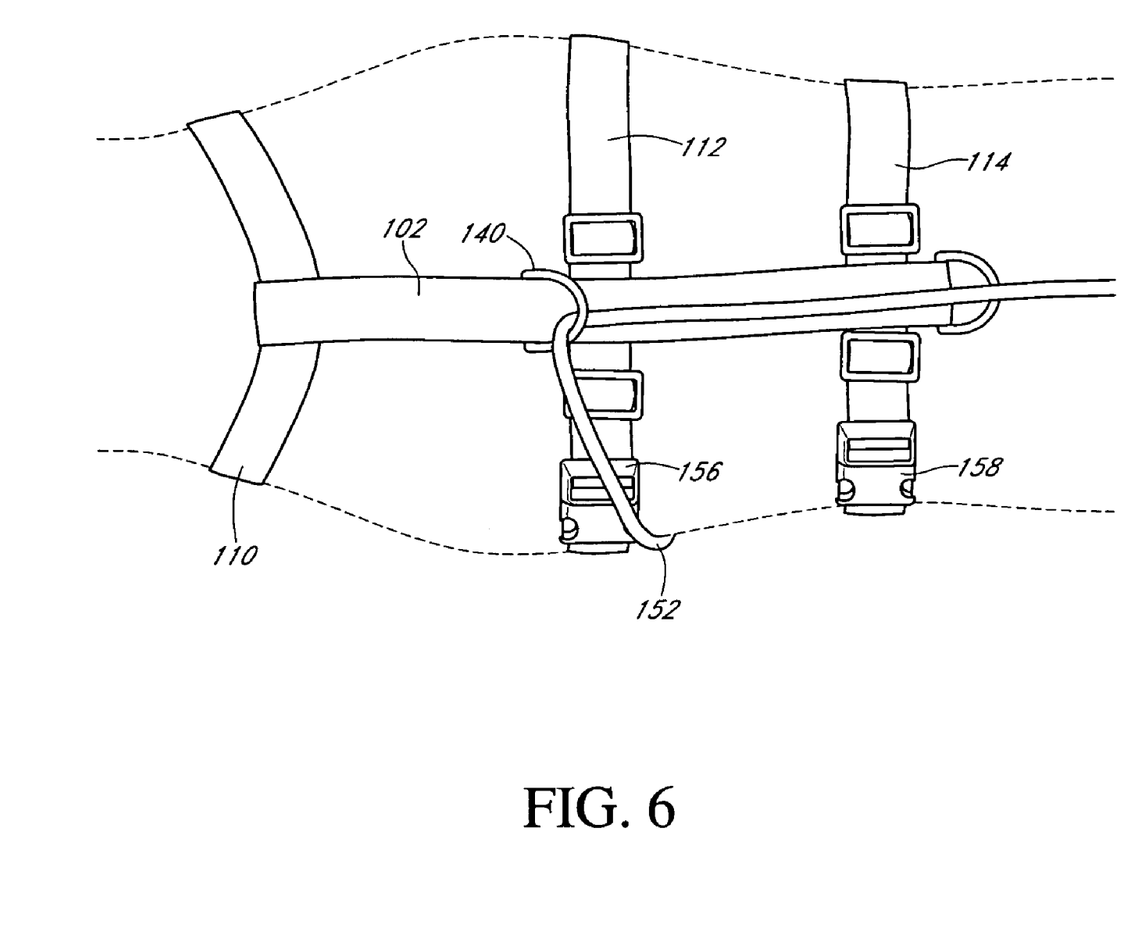
FIG. 6 is a top view of the animal harness and a lead of FIG. 2 fitted on an animal.
Figure 7:
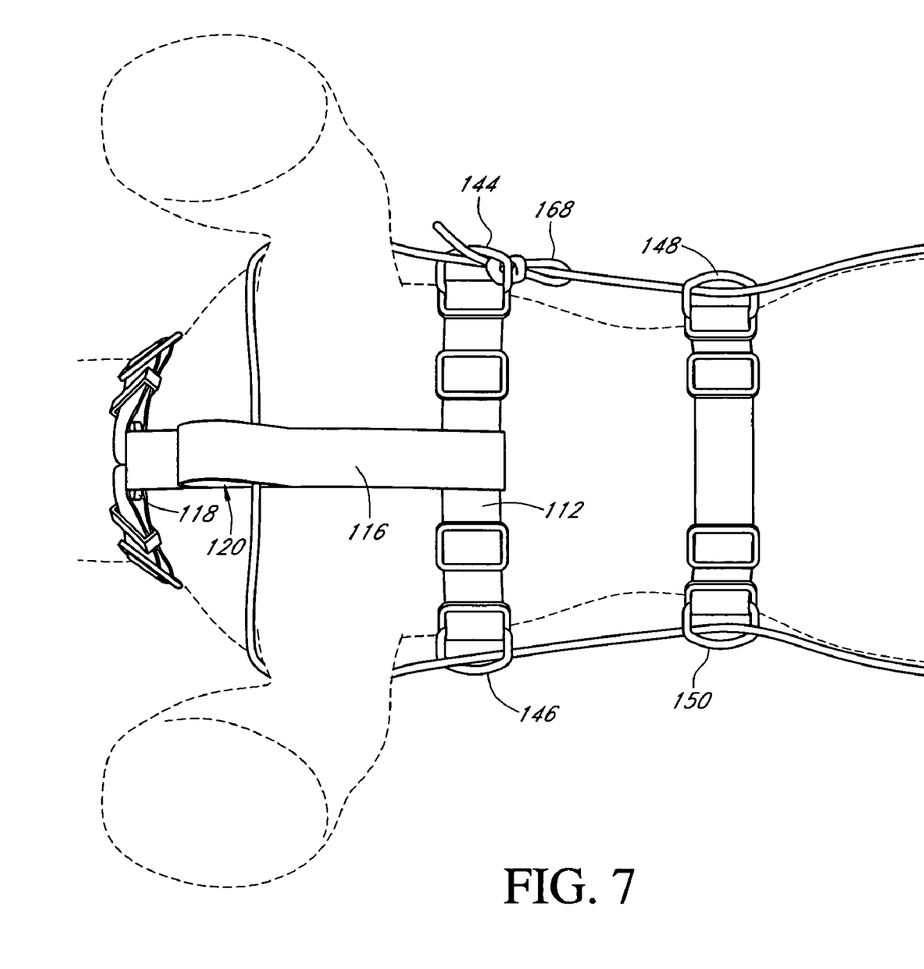
FIG. 7 is a bottom view of the animal harness and lead of FIG. 2 fitted on an animal.

The continuous cord 152 may be comprised of a front restraining member 152a and a back restraining member 152b. One end of the continuous cord 152 may have a loop 168 (See FIGS. 3 and 7) which may be threaded through ring 146 secured to the second loop strap 112. From ring 146, the continuous cord 152 may be threaded through the lower front strap opening 120 in the front strap 116 (See FIGS. 5 and 7) and ring 144, causing the front restraining member 152a of the continuous cord 152 to wrap around the chest of the animal. The continuous cord 152 may then pass through ring 148 and ring 150 causing the back restraining member 152b of continuous cord 152 to wrap around the hind legs of the animal. From ring 150 on the third loop strap, the continuous cord 152 may then pass through the loop 168 and continue upwardly passing through ring 140 secured to the longitudinal strap 102 (See FIGS. 3, 4 and 6). The remaining portion of the continuous cord 152 extending outwardly from ring 140 may then be used as a lead or leash. To control the animal, a handler may pull up on the continuous cord 152 causing the front and back restraining members 152a and 152b to pull on the animal's front and hind legs humanely restraining the animal into a submissive state.

Advantageously, embodiments of the invention allow a user to provide a humane harness for controlling and/or restraining an animal. As the harness is easy to use, it not does require a person to have a lot of strength to control the animal. The person may merely lift up on the leash holder with the leash using one finger to effortlessly control and/or restrain the animal. That is, by pulling on the leash or continuous cord, the front and/or hind legs of the animal are restrained, thereby preventing it from pulling the person. Furthermore, as the harness is adjustable, it may be fitted to various sizes of animals.

One or more of the components and functions illustrated in FIGS. 1, 2, 3, 4, 5, 6 and/or 7 may be rearranged and/or combined into a single component or embodied in several components without departing from the invention. Additional elements or components may also be added without departing from the invention.

While certain exemplary embodiments have been described and shown in the accompanying drawings, it is to be understood that such embodiments are merely illustrative of and not restrictive on the broad invention, and that this invention is not be limited to the specific constructions and arrangements shown and described, since various other modifications may occur to those ordinarily skilled in the art.

The invention claimed is:

1. An animal harness adapted to be attached to an animal, the harness comprising:
   a longitudinal strap for placing on the back of the animal, the longitudinal strap having a set of loop straps extending downwardly around the body of the animal, the set of loop straps comprising:
      a first loop strap for placing around a neck of the animal;
      a second loop strap for placing around a front body portion of the animal;
      a third loop strap for placing around a back body portion of the animal; and
   a continuous cord passing through a first pair of side rings on the second loop strap and a second pair of side rings on the third loop strap defining a front restraining member and a back restraining member; and wherein pulling upwards on the continuous cord, the front and back restraining members pull inward applying pressure to the front and back legs of the animal to restrain the animal.

2. The animal harness of claim 1, further comprising at least one first adjustable member on the first loop strap for selectively adjusting the length of first loop strap to accommodate the size of the neck of the animal.

3. The animal harness of claim 2, further comprising at least one second adjustable member on the second loop strap for selectively adjusting the length of the second loop strap to accommodate around the front body portion of the animal.

4. The animal harness of claim 3, further comprising at least one third adjustable member on the third loop strap for selectively adjusting the length of the third loop strap to accommodate around the back body portion of the animal.

5. The animal harness of claim 4, wherein the at least one first second and third adjustable member include at least one of a trislide or a buckle.

6. The animal harness of claim 1, further comprising a lower front strap secured to the first loop strap and the second loop strap for preventing the first loop strap from slipping off the animal.

7. The animal harness of claim 6, wherein the lower front strap is secured to the first loop strap with a connecting member.

8. The animal harness of claim 6, wherein the lower front strap includes an opening and wherein the front restraining member of the continuous cord passes through the opening.

9. The animal harness of claim 1, wherein the second loop strap includes a first end loop secured to a top connector portion and a second end loop secured to a bottom connector portion and wherein the top connector portion is detachably connected to the bottom connector portion.

10. The animal harness of claim 1, wherein the third loop strap includes a first end loop secured to a top connector portion and a second end loop secured to a bottom connector portion and wherein the top connector portion is detachably connected to the bottom connector portion.

11. The animal harness of claim 1, wherein the continuous cord may include at least one of a braided nylon rope, nylon webbing and leather.

12. The animal harness of claim 1, wherein the first pair and second pair of side rings are D-rings.

13. The animal harness of claim 1, wherein the set of loop straps are inserted into separate openings in the longitudinal strap.

14. An animal harness adapted to be attached to an animal, the harness comprising:
   a longitudinal strap for placing on the back of the animal, the longitudinal strap having a set of loop straps extending downwardly around the body of the animal, the set of loop straps comprising:
      a first loop strap for placing around a neck of the animal, the first loop strap including at least one first adjustable member for selectively adjusting the length of the first loop strap to accommodate the size of the neck of the animal;
      a second loop strap for placing around a front body portion of the animal, the second loop strap including at least one second adjustable member on the second loop strap for selectively adjusting the length of the second loop strap to accommodate around the front body portion of the animal;
      a third loop strap for placing around a back body portion of the animal, the third loop strap including at least one third adjustable member on the third loop strap for selectively adjusting the length of the third loop strap to accommodate around the back body portion of the animal; and
      a continuous cord passing through a first pair of side rings on the second loop strap and a second pair of side rings on the third loop strap defining a front restraining member and a back restraining member; and wherein pulling upwards on the continuous cord, the front and back restraining members pull inward applying pressure to the front and back legs of the animal to restrain the animal.

15. The harness of claim 14, further comprising a lower front strap secured to the first loop strap and the second loop strap for preventing the first loop strap from slipping off the animal.

16. The animal harness of claim 15, wherein the lower front strap is secured to the first loop strap with a connecting member.

17. The animal harness of claim 16, wherein the lower front strap includes an opening and wherein the front restraining member of the continuous cord passes through the opening.

18. The animal harness of claim 14, wherein the second loop strap includes a first end loop secured to a top connector portion and a second end loop secured to a bottom connector portion and wherein the top connector portion is detachably connected to the bottom connector portion.

19. The animal harness of claim 14, wherein the third loop strap includes a first end loop secured to a top connector portion and a second end loop secured to a bottom connector portion and wherein the top connector portion is detachably connected to the bottom connector portion.

20. An animal harness adapted to be attached to an animal, the harness comprising:
- a longitudinal strap for placing on the back of the animal, the longitudinal strap having a set of loop straps extending downwardly around the body of the animal, the set of loop straps comprising:
  - a first loop strap for placing around a neck of the animal, the first loop strap including at least one first adjustable member for selectively adjusting the length of the first loop strap to accommodate the size of the neck of the animal;
  - a second loop strap for placing around a front body portion of the animal, the second loop strap including at least one second adjustable member on the second loop strap for selectively adjusting the length of the second loop strap to accommodate around the front body portion of the animal, a first end loop secured to a top connector portion and a second end loop secured to a bottom connector portion, whereby the top connector portion is detachably connected to the bottom connector portion;
  - a third loop strap for placing around a back body portion of the animal, the third loop strap including at least one third adjustable member on the third loop strap for selectively adjusting the length of the third loop strap to accommodate around the back body portion of the animal, a third end loop secured to a top connector portion and a fourth end loop secured to a bottom connector portion, whereby the top connector portion is detachably connected to the bottom connector portion;
- a lower front strap secured to the first loop strap and the second loop strap for preventing the first loop strap from slipping off the animal; and
- a continuous cord passing through a first pair of side rings on the second loop strap and a second pair of side rings on the third loop strap defining a front restraining member and a back restraining member; and wherein pulling upwards on the continuous cord, the front and back restraining members pull inward applying pressure to the front and back legs of the animal to restrain the animal.

* * * * *